United States Patent [19]
Casaro et al.

[11] Patent Number: 6,074,165
[45] Date of Patent: Jun. 13, 2000

[54] VACUUM PUMP WITH MAGNETIC BEARING SYSTEM AND BACK-UP BEARINGS

[75] Inventors: Fausto Casaro, Turin, Italy; Alain Laager, Péry; Roland Siegwart, Schwyz, both of Switzerland

[73] Assignee: Varian, Inc., Palo Alto, Calif.

[21] Appl. No.: 09/037,762

[22] Filed: Mar. 10, 1998

[51] Int. Cl.[7] .......................... F01D 25/16; F03B 11/06; F04D 29/04
[52] U.S. Cl. .................. 415/90; 415/90; 415/111; 415/229; 415/230; 415/170.1; 384/101; 384/102; 310/90.5
[58] Field of Search ............................. 415/90, 111, 229, 415/230, 170.1; 384/101, 102; 310/90.5

[56] References Cited

U.S. PATENT DOCUMENTS 4,023,920  5/1977  Bächler et al. .
4,312,628  1/1982  Yamamura .............................. 417/424
5,165,872  11/1992  Fleischmann et al. ............... 417/423.4
5,238,362  8/1993  Casaro et al. .
5,747,907  5/1998  Miller ....................................... 310/90

Primary Examiner—Edward K. Look
Assistant Examiner—Rhonda Barton
Attorney, Agent, or Firm—Bella Fishman

[57] ABSTRACT

A vacuum pump is provided with back-up bearings in addition to magnetic bearings for supporting its rotor with respect to the pump housing. The rotor has a hollow rotary shaft extending backwards enclosing in its inner space a forwardly protruding tubular shaft affixed to the pump housing, and another cylindrical member affixed to the rotor protrudes backward inside this fixed tubular shaft. One set of back-up bearings is provided on the outer surface of the fixed tubular shaft spaced from the inner surface of the rotor shaft and another set of back-up bearings is provided on the inner surface of the fixed tubular shaft, spaced from the protruding cylindrical member. The back-up bearings thus positioned can be made smaller for improved dynamic emergency capabilities.

9 Claims, 2 Drawing Sheets

VACUUM PUMP WITH MAGNETIC BEARING SYSTEM AND BACK-UP BEARINGS

BACKGROUND OF THE INVENTION

This invention relates to a vacuum pump with a bearing assembly and more particularly to the vacuum pump with a magnetic bearing system of the kind having back-up bearings contained inside the shaft of the vacuum pump. This mechanical bearings set up is disclosed in the U.S. patent application No. 08/858,230 filed by Varian Associates, Inc.

The U.S. Pat. No. 5,238,362 issued Aug. 24, 1993 to Casaro, et al. discloses a turbomolecular vacuum pump for which a system according to this invention can be suitable and is assigned to the assignee herein. This patent will be incorporated herein by reference, detailed accounts of some of common components of a vacuum pump being thus omitted.

Although a vacuum pump according to aforementioned U.S. Pat. No. 5,238,362 provides increased compression ratios, it is desirable to keep improving the quality of such a vacuum pump, for example, by providing an improved bearing assembly with improved capability in radial and axial position sensing and a reduced size.

SUMMARY OF THE INVENTION

It is an object of this invention to provide a vacuum pump with an improved magnetic bearing system having back-up bearings and more particularly to the turbopump with such a system which is compact and easy to disassemble.

A magnetic bearing system of the vacuum pump embodying this invention, with which the above and other objects can be accomplished, may be characterized not only as comprising a rotor with a hollow rotary shaft, a pump housing enclosing the rotor and magnetic bearings for supporting the rotor inside the pump housing, but also wherein a fixed tubular shaft is disposed inside the rotary shaft, supporting a set of back-up bearings on its outer surface spaced from the inner wall of the rotor shaft and another set of back-up bearings on its inner surface. A cylindrical member attached to the rotor protrudes into the inner space of the tubular fixed shaft, spaced by a small gap from the internally mounted back-up bearings.

The mechanical back-up bearings, thus mounted, can be made smaller than back-up bearings used in prior art magnetic bearing systems, thereby improving the dynamic emergency capabilities of the magnetic bearing system.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings.

DETAILED DESCRIPTION OF THE DRAWINGS

Figure 1:
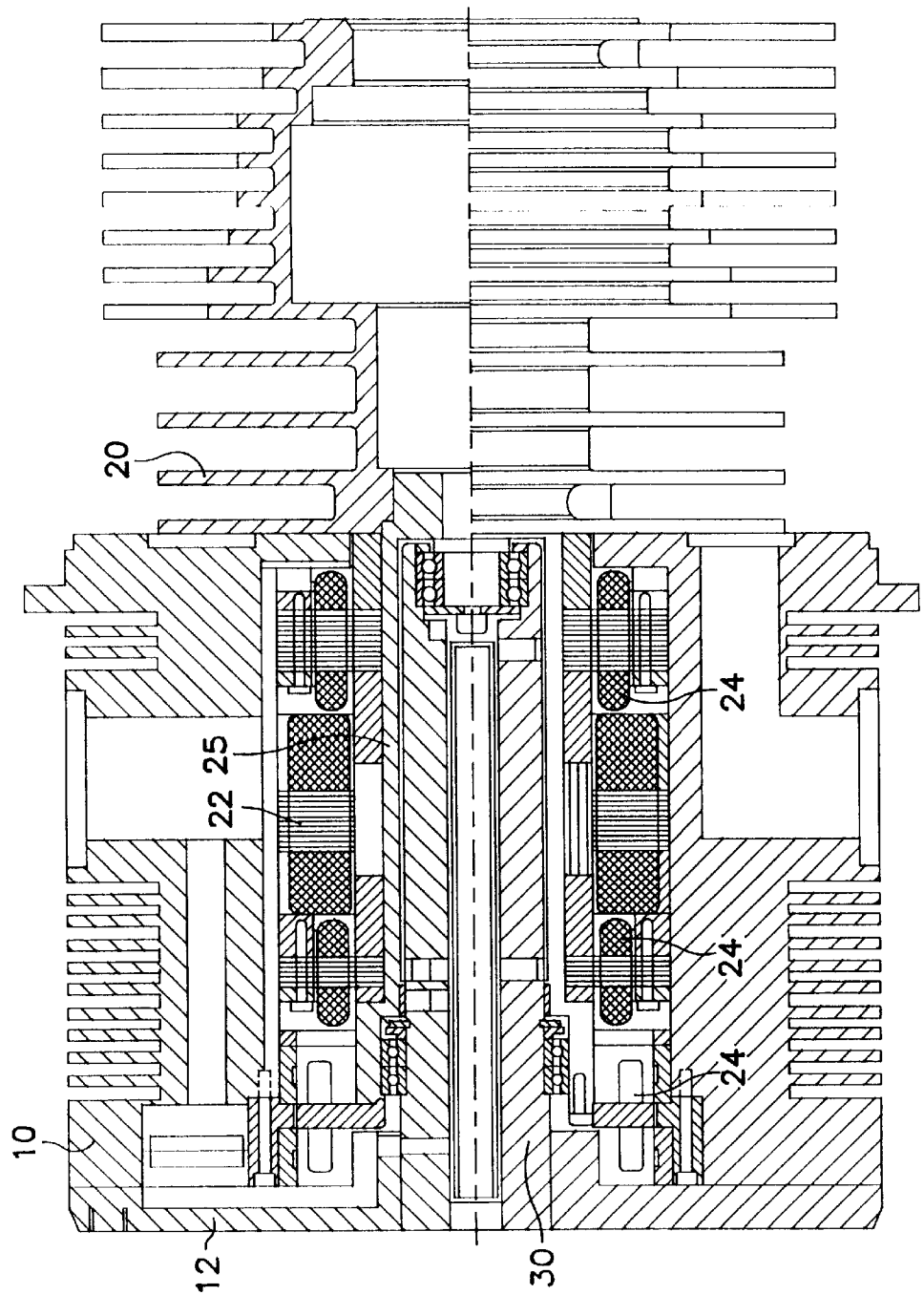
FIG. 1 is a sectional view of a magnetic bearing system embodying this invention incorporated in a vacuum pump.

FIG. 1 shows a magnetic bearing system embodying this invention incorporated in a vacuum pump of the kind disclosed in aforementioned U.S. Pat. No. 5,238,362, numeral 10 indicating the housing structure of the vacuum pump and numeral 20 generally indicating its rotor, enclosed inside the pump housing 10. Numeral 22 indicates an electric motor for the rotation of the rotor 20 and numeral 24 indicates magnetic bearings which may be of a known kind, disclosed, for example, in U.S. Pat. No. 4,023,920 for magnetically supporting the rotor 20 with respect to the pump housing 10.

Figure 2:
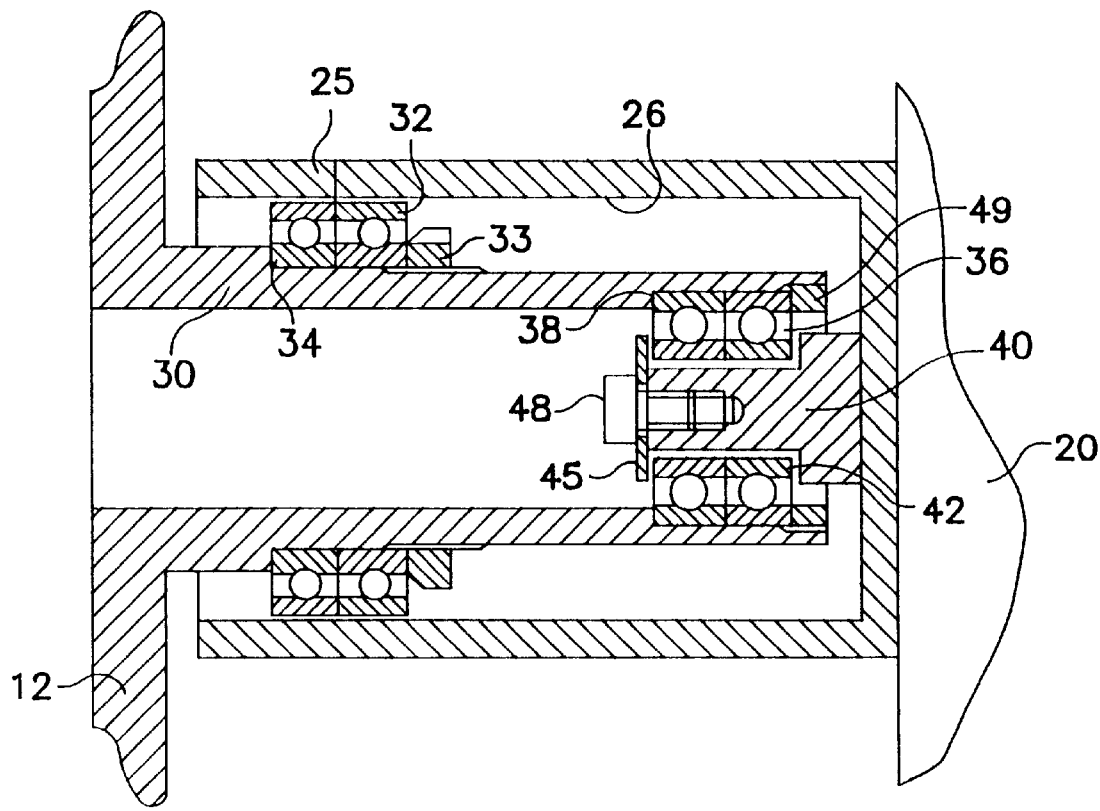
FIG. 2 is a schematic sectional view of a portion of the system shown in FIG. 1.

FIG. 2 shows schematically a portion of FIG. 1 where mechanical back-up bearings are provided for continuing to support the rotor 20 with respect to the pump housing 10 in the case of an emergency where the magnetic bearings 24 fail to function properly. With reference simultaneously to FIGS. 1 and 2, and more particularly to FIG. 2, numeral 25 indicates a longitudinally elongated rotary shaft (or "the rotor shaft") which is attached firmly to the rotor 20, extending longitudinally backward (to the left with reference to FIGS. 1 and 2) and around the axis of which the rotor 20 is adapted to rotate. As shown in FIGS. 1 and 2, the back end part of the rotor shaft 25 is tubular, having a cylindrical inner wall 26 which encloses therein a longitudinally elongated inner space opening to the back.

The pump housing 10 has a flange part 12 attached thereto at its back end. A stationary tubular cylindrical shaft (hereinafter referred to as "the fixed shaft 30") for supporting the aforementioned back-up bearings (to be described in detail below) is attached to this flange 12, protruding in the forward direction therefrom coaxially with and in the inner space of the rotor shaft 25. The rotor 20 has a cylindrical protrusion 40 which is coaxial with the rotor shaft 25 and extends backwards, penetrating into the hollow interior of this fixed shaft 30 from the front side.

A set of mechanical annular bearings 32 (hereinafter referred to as "the backward backup bearings") is mounted on the outer surface of the fixed shaft 30 at a relatively backward position, with their external surfaces spaced from the inner wall 26 of the rotor shaft 25, leaving a specified gap therebetween. An annular nut 33 with a threaded inner surface is similarly mounted in front of the backward back-up bearings 32, engaging with a threaded portion on the outer surface of the fixed shaft 30 such that the backward back-up bearings 32 can be pushed backward, as the nut 33 is rotated, against a step 34 formed on the outer surface of the fixed shaft 30, as shown in FIG. 2, such that the backward back-up bearings 32 can be securely fastened to the fixed shaft 30, prevented from sliding in the longitudinal direction during the operation of the vacuum pump.

Another set of mechanical annular bearings 36 (hereinafter referred to as "the forward back-up bearings") is mounted on the inner wall of the fixed shaft 30 near its forward end such that their inner surfaces are in a face-to-face relationship with but spaced from the outer cylindrical surface of the protrusion 40, leaving a specified gap therebetween. The forward backup bearings 36 are sandwiched between a step 38 formed on the inner surface of the tubular fixed shaft 30 and the side surface of nut 49 when screwed on the suitable thread in the inner surface of shaft 30, as shown in FIG. 2, so as to be prevented from changing their positions in the longitudinal direction during the operation of the vacuum pump.

An axial stopper plate 45 is attached to the tip (or the backward end) of the backwardly extending protrusion 40 by means of a screw 48, serving to prevent the protrusion 40 from sliding forward with respect to the fixed shaft 30. The step 42 formed on the cylindrical protrusion 40 serves to prevent the protrusion 40, and so the rotor shaft 25 and the rotor 20, from sliding backward with respect to the fixed shaft 30. A predetermined axial gap is left between forward backup bearing set and both stopper means: the axial stopper plate 45 and step 42.

Although the invention has been described above by way of a single embodiment, this embodiment is not intended to limit the scope of the invention. Many modifications and variations are possible within the scope of the invention. Although the vacuum pump, into which the present invention is intended to be incorporated, has been only schematically described, neither is this schematic description intended to limit the scope of the invention. In general, it is expected that magnetic bearings be provided for the displacement of the rotor shaft both in the radial and axial directions, and sensors for such displacements are usually provided. Positioning of such magnetic bearings and sensors is not intended to limit the scope of the invention.

One of the advantages of the present invention, as described above, is that the back-up bearings, being disposed inside the rotor shaft 25 can be made smaller, independent of the size of the magnetic bearings. In particular, the forward back-up bearings 36, attached inside the fixed shaft 30 which is disposed inside the rotor shaft 25, can be made conveniently smaller. Being smaller and having smaller masses of rolling elements, the forward back-up bearings 36, in particular, have the capability of faster acceleration, providing better dynamic emergency capabilities.

The components according to this invention are also easier to assemble to produce the whole system. Because of the open tubular design of the rotor shaft 25, the system can be disassembled easily from the back side, and the back-up bearings can be changed even if the system is accessible only from the back side (which is the lower side if the pump is set up in the vertical orientation).

All such modifications and variations that may be apparent to a person skilled in the art are intended to be included within the scope of this invention.

What is claimed is:

1. A vacuum pump with a magnetic bearing system including a rotor, a pump housing enclosing said rotor and magnetic bearings for supporting said rotor with respect to said pump housing, said magnetic bearing system comprising:
    a rotary rotor shaft attached to said rotor so as to rotate with said rotor, said rotor shaft having an axially elongated tubular back end part having a cylindrical inner wall which encloses an inner space therein;
    a fixed tubular shaft being affixed to said pump housing and extending forward inside said inner space coaxially with said rotor shaft;
    backward back-up bearings set supported externally around said fixed tubular shaft inside said inner space of said rotor shaft and spaced from said inner wall of said rotor shaft;
    a cylindrical protrusion affixed to said rotor so as to rotate coaxially with said rotor shaft and extending backward inside said fixed tubular shaft; and
    forward back-up bearings set contained inside and attached coaxially to said fixed tubular shaft so as to be opposite to and spaced from said protrusion.

2. The vacuum pump with the magnetic bearing system of claim 1, further comprising a protrusion stopper means for maintaining said protrusion and said forward back-up bearings in a mutually opposite positional relationship.

3. The vacuum pump with the magnetic bearing system of claim 2, wherein said protrusion stopper means includes a plate and a screw for fastening said plate to a front end of said protrusion, wherein said rotor becomes removable from said pump housing by removing said screw from said protrusion, said plate and said set of forward back-up bearings form a gap therebetween.

4. The vacuum pump with the magnetic bearing system of claim 3, wherein said protrusion stopper means further comprising a step which is formed therein, said step and said set of forward back-up bearings form a gap therebetween.

5. The vacuum pump with the magnetic bearing system of claim 1, wherein said forward back-up bearings are axially at a forward position with respect to said backward back-up bearings.

6. The vacuum pump with the magnetic bearing system of claim 1, further comprising backward back-up bearing affixing means for preventing said backward back-up bearings from sliding axially along said fixed tubular shaft.

7. The vacuum pump with the magnetic bearing system of claim 6, wherein said backward back-up bearing affixing means include a step which is formed on an external surface of said fixed tubular shaft and a ring nut mounted on said external surface of said fixed tubular shaft serving to press said backward back-up bearing axially backward against said step.

8. The vacuum pump with the magnetic bearing system of claim 1, further comprising forward back-up bearing affixing means for preventing said forward back-up bearings from sliding axially along said fixed tubular shaft.

9. The vacuum pump with the magnetic bearing system of claim 8, wherein said forward back-up bearing affixing means comprise a step which is formed on an interior surface of said fixed tubular shaft and a ring nut mounted on said interior surface of said fixed tubular shaft serving to press said forward back-up bearing axially backward against said step.

* * * * *